Oct. 20, 1970     J. J. JOHNSTON     3,535,620
METHODS OF AND SYSTEMS FOR DETECTING AND ANALYZING WHETHER
A GENERATED PULSE POSSESSES DESIRED CHARACTERISTICS
Filed Nov. 16, 1967     2 Sheets-Sheet 1
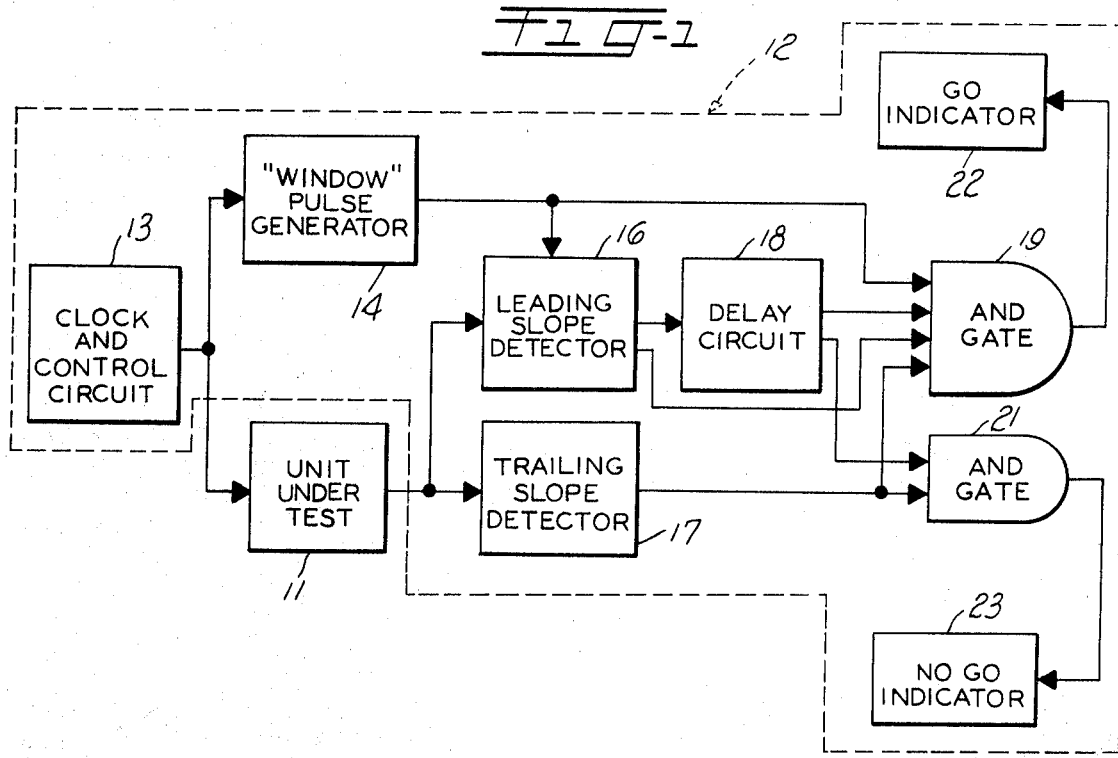
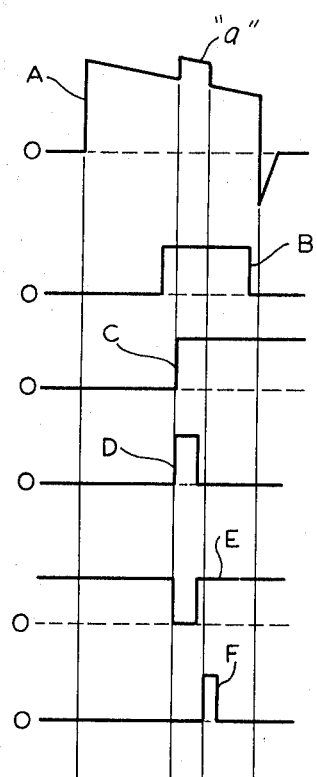
INVENTOR
J.J. JOHNSTON
BY
ATTORNEY United States Patent Office 3,535,620
Patented Oct. 20, 1970

3,535,620
METHODS OF AND SYSTEMS FOR DETECTING AND ANALYZING WHETHER A GENERATED PULSE POSSESSES DESIRED CHARACTERISTICS
James J. Johnston, Columbus, Ohio, assignor to Western Electric Company, Incorporated, New York, N.Y., a corporation of New York
Filed Nov. 16, 1967, Ser. No. 683,660
Int. Cl. G01r 31/00
U.S. Cl. 324—28                                   12 Claims

ABSTRACT OF THE DISCLOSURE

Methods of and electrical systems for detecting a pulse developed during the release of a relay and analyzing the voltage amplitude and width of the pulse as indications of the acceptability of impedance and release time characteristics of the relay regardless of unwanted sporadic pulses developed by the bounce of closing contacts of the relay. A pair of detectors are conditioned at selected times to detect the leading and trailing slopes of the pulse to determine whether the pulse width occurs within acceptable limits. Capacitance circuit respond to the voltage change during rapid rise and fall times of the leading and trailing slopes of the pulse to control the operation of the detectors as an indication of the acceptability of the voltage amplitude of the pulse and, hence, the impedance characteristics of the relay. Either a GO or a NO-GO indicator is operated to indicate the results of the analyzing of the pulse. When the analyzing of the pulse is completed, a flip-flop is set to preclude erroneous operation of the indicators due to the unwanted sporadic pulses.

BACKGROUND OF THE INVENTION

Field of the invention

This invention relates to methods of and systems for detecting and analyzing a pulse and more particularly relates to methods of and systems for detecting the presence of a pulse and analyzing the voltage amplitude and width of the pulse to verify that the pulse is within acceptable limits.

Description of the prior art

In the testing of various types of electronic equipment, a pulse is developed by each piece of equipment with the pulse carrying the intelligence representing the test results. Frequently, the conditions under which the tests are conducted varies with each piece of equipment due to differences in the quality of test connections, minor variations in the characteristics of components of the various pieces of equipment and certain allowable tolerances. Therefore, the developed pulse must be analyzed to determine whether the associated piece of equipment is acceptable.

Particularly, in the testing of circuits of magnetic latching type relays, a pulse is developed during a portion of a release period when the relay is released from an operated condition. The voltage amplitude and width of the pulse provide intelligence as to the acceptability of impedance and release time characteristics of the relay. Due to internal characteristics, which vary from one relay to another, in the circuit of the magnetic latching relay, the developed pulse of one relay may differ from the developed pulse of another relay. Consequently, acceptable conditions must be established which take into account the variables associated with the different relays. In addition, contacts associated with the circuit of each magnetic latching relay invariably will bounce during portions of the period when the relay is being released from the operated condition. If the contacts bounce during the release period, short-duration, sporadic pulses could be developed during a period when the pulse to be analyzed is developed and result in erroneous analyzing of the developed pulse.

SUMMARY OF THE INVENTION

Therefore, it is an object of this invention to provide new and improved methods of and systems for detecting a pulse.

Another object of this invention is the provision of new and improved methods of and systems for detecting a pulse and analyzing various features of the pulse.

Still another object of this invention is the provision of new and improved methods of and systems for detecting a pulse and analyzing various features of the pulse regardless of the occurrence of sporadic pulses after the occurrence of the pulse being detected and analyzed.

A further object of this invention is the provision of new and improved methods of and systems for detecting a pulse developed during a period of operation of a piece of equipment and for analyzing the voltage amplitude and width of the pulse to determine whether the equipment functions within acceptable limits during the period of operation.

An additional object of this invention is the provision of new and improved methods of and systems for detecting a pulse developed during a period when a magnetic latching relay is being released from an operated condition and for analyzing the voltage amplitude and width of the developed pulse to determine whether impedance and release time characteristics of the relay are within acceptable limits without concern for any sporadic pulses developed by bounce of contacts of the relay when the relay is released.

A method of detecting and analyzing a pulse to determine whether the width and voltage amplitude of the pulse is acceptable includes the steps of detecting the occurrence of a leading slope of the pulse in response to the rise time and voltage amplitude of the leading slope and detecting the occurrence of a trailing slope of the pulse in response to the fall time and voltage amplitude of the trailing slope. A period is developed to occur a predetermined time after the detecting of the occurrence of the leading slope of the pulse; and if the trailing slope of the pulse occurs during the period, an acceptance of the pulse width and voltage amplitude is indicated in response thereto.

If the trailing slope occurs prior to the period, the unacceptance of the width of pulse is indicated. Even though sporadic pulses may occur after the occurrence of the trailing slope of the pulse being detected and analyzed, the indication of acceptance, or unacceptance, is continued where the sporadic pulses would ordinarily have resulted in the providing of an erroneous indication opposite from the indication actually provided.

A system for detecting a pulse developed by the releasing of an operated magnetic latching relay and for analyzing the voltage amplitude and width of the pulse as an indication of the acceptability of impedance and release time characteristics of the relay may include a first detector which is conditioned for detecting the leading slope of the pulse during a first defined period and for developing and output signal representative of the occurrence of the leading slope of the pulse during the first defined period. A second detector is conditioned during a second defined period for detecting the trailing slope of the pulse and for developing an output signal representative of the occurrence of the trailing slope of the pulse during the second defined period.

Capacitors in both detectors respond to rapid rise and fall times for the leading and trailing slopes, respectively, of the pulse to establish momentary voltage levels sufficient to control transistor enabling circuits of the detectors. If the voltage amplitude is sufficiently high, the rapid change of voltage level during the rise and fall times enables the detectors to develop the output signals as an indication of the acceptability of the voltage level of the pulse.

Hence, the system detects initially the presence of the pulse developed when the magnetic latching relay is released. The system then develops signals in response to rapid rise and fall times of leading and trailing slopes, respectively, of the pulse if the voltage amplitude of the pulse is sufficiently high. Since the voltage amplitude of the pulse is directly related to the impedance characteristics of the relay, the developed signals are an indication of the acceptabiilty of the impedance characteristics of the relay.

If the release time characteristics of the relay are acceptable, the signals are developed by the detectors during the defined periods which indicate an acceptable width of the pulse resulting from acceptable release time characteristics. Therefore, while only one pair of the signals are developed by the detectors for each relay being tested, the pair of signals relates directly to both the voltage amplitude and width of the pulse and, consequently, to the impedance and release time characteristics of the relay being tested.

In analyzing the width of the pulse, signals are developed by the detectors in response to the occurrence of the leading and trailing slopes of the pulse during the associated defined periods. Since the system examines the width of the pulse by determining when the leading and trailing slopes of the pulse occur, the system is conditioned to ignore any brief signals which may be developed by the bounces of the contacts of the relay during the release period. Thus, the release time characteristics of the relay may be analyzed without concern for unwanted, brief, sporadic signals developed by the bounces of the contacts of the relay during the release period.

BRIEF DESCRIPTION OF THE DRAWING

Other objects and features of the present invention will be more readily understood from the following detailed description thereof when read in conjunction with accompanying drawings in which:

FIG. 1 is a block diagram showing a system for detecting and analyzing a pulse in accordance with the principles of the invention;

FIG. 3 is a view showing waveforms of pulses which occur at various points in the system shown in FIG. 2.

DETAILED DESCRIPTION

Figure 2:
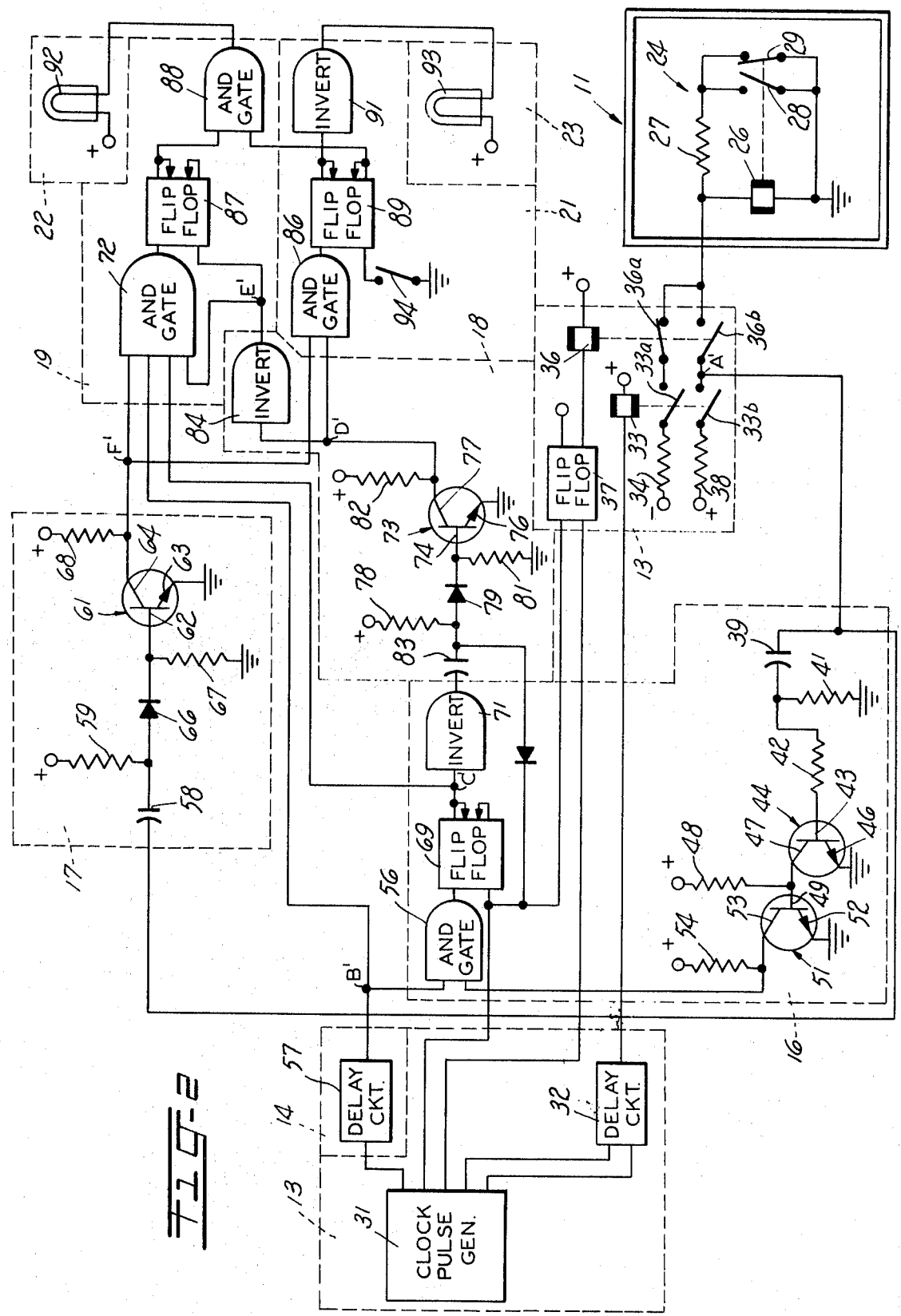
FIG. 2 is a schematic illustration showing in detail a system for detecting and analyzing a pulse in accordance with the principles of the invention.

Referring now to FIG. 1, a unit 11 under test receives controlling pulses from a system, designated generally by the reference numeral 12, for controlling the unit to develop an output pulse $a$ (FIG. 3), which is superimposed on a pulse A (FIG. 3) at an output of the unit wherein the pulse carries intelligence relating to various characteristics of the unit. Desirably, the output pulse $a$ from the unit 11 should have steep leading and traling edges, which will hereinafter be referred to as slopes, and should have a pulse width which comes within defined limits in order to determine time characteristics of the unit. It is noted that the term slope implies a slant or inclined form. However, the use of the term slope, as hereinafter applied, refers to any pulse edge including those which are perpendicular to a standard, horizontal pulse reference line such as the "0" line of the pulse A (FIG. 3). In addition, the voltage amplitude of the output pulse $a$ of the unit 11 under test is significant and relates to impedance characteristics of the unit. The system 12 detects the output pulse $a$ of the unit 11 and analyzes the pulse in terms of pulse width and voltage amplitude to determine whether time and impedance characteristics of the unit are acceptable.

The system 12 includes a clock and control circuit 13 for developing necessary pulses for controlling the operation of the unit 11 under test during a testing cycle. The clock and control circuit 13 could include a conventional multivibrator and counting system for generating pulses which may have varying pulse widths and be provided as outputs at different intervals. The clock and control circuit 13 also provides the pulse for a "window" pulse generator 14, which actually delays the input pulse for a defined period beginning with the initial application of a control pulse to the unit 11 and develops a gating pulse B (FIG. 3) at a predetermined time and having a predetermined pulse width.

The system 12 further includes a leading-slope detector 16 and a trailing-slope detector 17 for detecting the leading and trailing slopes, respectively, of the output pulse $a$ of the unit 11. A delay circuit 18 develops a gating pulse E (FIG. 3), which is applied to a first AND gate 19, and also develops an intermediate pulse D (FIG. 3), which is applied to a second AND gate 21. A GO indicator 22 and a NO-GO indicator 23 provide visual indication of the acceptability of the unit 11 under test as determined by detecting and analyzing the output pulse $a$ of the unit.

Initially, the clock and control circuit 13 provides an input pulse to the unit 11 under test where, due partially to the characteristics of the unit, the output pulse $a$ to be analyzed is developed from the unit. Since the voltage amplitude, pulse shape and width of the output pulse $a$ are controlled by the characteristics of the unit 11, these features of the output pulse are directly related to the characteristics of the unit. One desired result is that the output pulse $a$ of the unit 11 under test should occur within a defined period after the input pulse from the clock and control circuit 13 has been applied to the unit. To determine whether this occurs, the "window" pulse generator 14 develops, at a predetermined time, the gating "window" pulse B having a pulse width which defines the time period within which the output pulse $a$ of the unit 11 should occur. It is noted that the "window" pulse generator 14 receives the same input pulse from the clock and control circuit 13 which is applied to the unit 11 and delays the developing of the gating pulse B therefrom until a time period during any portion of which the output pulse of the unit 11 should desirably occur.

The gating "window" pulse B, which is developed by the "window" pulse generator 14, is fed to one input of the leading-slope detector 16 to condition the detector for operation when the output pulse $a$ of the unit 11 under test is received by the detector. When the output pulse $a$ of the unit 11 is fed to the leading slope detector 16, capacitive elements of the detector respond to the rise time and voltage amplitude of the leading slope of the pulse, and enables the detector to develop a leading slope indicator pulse C (FIG. 3) if the output pulse of the unit exceeds a minimum voltage amplitude. Hence the output pulse $a$ of the unit 11 must occur during a period defined by the leading and trailing edges of the gating "window" pulse B developed by the "window" pulse generator 14 to enable the leading-slope detector 16. The leading-slope indicator pulse C, which is developed by the leading-slope detector 16, is coupled to one input of the AND gate 19. In addition, the gating "window" pulse B is also coupled to one input of the AND gate 19. Another pulse developed by the leading-slope detector 16 is fed to the delay circuit 18.

The output pulse $a$ of the unit 11 under test is also fed to the trailing-slope detector 17, which responds to the occurrence of the trailing slope of the output pulse of the unit and develops an enabling pulse F (FIG. 3). The trailing-slope detector 17 is also provided with capacitive elements which respond to the fall time and the voltage amplitude of the output pulse $a$ of the unit 11 for developing the enabling pulse F of the detector. Hence, if the voltage amplitude of the output pulse $a$ of the unit 11 is below a certain value, the trailing-slope detector 17 will not develop the enabling pulse F.

The output pulse F developed by the trailing-slope detector 17 is coupled to one input of the AND gate 19 and is also coupled to the AND gate 21. As previously noted, one output pulse of the leading-slope detector 16 is fed to the delay circuit 18 which develops the gating pulse E after a period of time wherein the gating pulse E of the delay circuit represents the time period within which the trailing slope of the output pulse $a$ of the unit 11 should desirably occur. It is noted that the leading-slope indicator pulse C of the leading-slope detector 16 and the gating "window" pulse B of the "window" pulse generator 14 are of sufficient pulse width to occur simultaneously with the output pulses F and E of the trailing-slope detector 17 and the delay circuit 18, respectively. When some portions of each of the four input pulses B, C, E and F to the AND gate 19 occur simultaneously, the characteristics of the unit 11 under test are acceptable; and the AND gate 19 develops an output pulse which is coupled to and operates the GO indicator 22 to provide indication of the acceptablility of the unit.

As noted, an intermediate pulse D developed by the delay circuit 18 is coupled to one input of the AND gate 21. This pulse D is developed by the delay circuit 18 during a period beginning with the time of the leading slope of the output pulse $a$ of the unit 11 and terminating shortly before the occurrence of the trailing slope of the output pulse of the unit. The pulse D, coupled from the delay circuit 18 to the AND gate 21, conditions the AND gate 21 for operation during a period preceding the desirable time for the occurrence of the trailing slope of the output pulse $a$ of the unit 11 and, therefore, defines a time period when the occurrence of the trailing slope of the output pulse of the unit should not occur. Hence, if the trailing slope of the output pulse $a$ of the unit 11 should occur prior to the desirable time, that is during the period of the intermediate pulse D from the delay circuit 18 to the AND gate 21, the trailing-slope detector 17 will develop the enabling pulse F which is also coupled to the AND gate 21. Upon reception of these two input pulses D and F, the AND gate 21 develops an output pulse which is coupled to and operates the NO-GO indicator 23 thereby providing indication of the insufficient width of the output pulse of the unit 11 and, consequently, the unacceptability of the unit 11.

Even though portions of the three pulses B, C and E from the "window" pulse generator 14, the leading-slope detector 16 and the delay circuit 18, respectively, may occur simultaneously at the associated inputs of the AND gate 19, if the enabling pulse F developed by the trailing-slope detector 17, which is coupled to the AND gate 19, precedes the simultaneous occurrence of portions of the other three pulses B, C and E, the AND gate 19 will not be enabled to develop an output pulse.

Therefore, if the voltage amplitude of the output pulse $a$ of the unit 11 is below a defined level, thereby indicating unacceptable impedance characteristics of the unit, the leading-slope detector 16 and the trailing-slope detector 17 will not develop the pulses C and F which indicates the insufficiency of the voltage amplitude of the output pulse of the unit. Further, by utilizing the detectors 16 and 17, the pulses C and F, respectively, are generated substantially simultaneously with the occurrence of the leading and trailing slopes, respectively, of the output pulse $a$ of the unit 11 thereby providing an indication of the pulse width of the output pulse of the unit. By further utilizing the delay circuit 18, which is triggered by the occurrence of the leading slope of the output pulse $a$ of the unit 11, the time for a desired pulse width is established; and if the trailing slope of the output pulse of the unit occurs prior to the beginning of this time period, an indication is provided of undesirable pulse width and hence, unacceptable time characteristics of the unit.

Referring now to FIG. 2, the unit 11 under test in a specific embodiment is a magnetic latching type relay, designated generally by the reference numeral 24, which includes a coil 26, a resistance 27, a normally open contact 28 and a normally closed contact 29 connected in a predetermined arrangement. In normal operation of the relay 24, an operating potential, in the form of an operate pulse, is applied across the coil 26 whereupon contacts, electrically external of the coil, are reversed from a normal condition. In addition, the contact 28 is closed and the contact 29 is opened. When the coil 26 has been pulsed in this manner to operate the relay 24, the pulse may be removed and the relay will remain in the operated state due to magnetic characteristics of a core material of the relay. In order to release the relay 24, a release pulse, which is opposite in polarity from the operate pulse, must be applied across the coil 26. During the period when the release pulse is applied across the coil 26, the contacts 28 and 29 will revert to their normal state. During this period of reverting by the contacts 28 and 29, there is a brief period when both contacts are open. When both contacts 28 and 29 are open for the brief period, the resistor 27 is disconnected from the circuit including the coil 26. Since the resistor 27 and the coil 26 are normally connected in parallel through either of the contacts 28 or 29, the effective resistance of the circuit of the relay 24 will increase during the brief period when the contacts 28 and 29 are both open.

When the circuit of the relay 24 is observed for any waveform appearing thereacross during the period when the release pulse is applied to the relay, the definition of the pulse A, appearing at point A' (FIG. 2), would be observed with the small, well-defined pulse $a$ superimposed on the pulse A during the period when the contacts 28 and 29 are both open. The definition of the small pulse $a$ in terms of voltage amplitude and width is indicative of the impedance and release time characteristics of the relay 24. The system 12 has been designed to detect and analyze the small pulse $a$ which is superimposed on the pulse and which occurs when the contacts 28 and 29 are both open.

A portion of the clock and control circuit 13 of the system 12 includes a clock-pulse generator 31 which may be composed of a conventional multivibrator and counting system to provide output pulses at defined intervals. Initially, the clock-pulse generator 31 develops a pulse which is coupled to a conventional-type delay circuit 32 which deevlops a low potential signal, e.g. at ground. It is noted that the delay circuit 32 is also included in the clock and control circuit 13. The low signal developed by the delay circuit 32 is connected to one side of a relay coil 33 within the clock and control circuit 13 with the other side of the coil being connected to a positive potential. When the coil 33 is connected between ground of the low signal and the positive potential level, contacts 33$a$ and 33$b$, which are associated with the coil, are closed from a normally open state. When the contact 33$a$ is closed, a series circuit is completed and includes a negative potential, a current-limiting resistor 34, the closed contact 33$a$, a normally closed contact 36$a$ of a relay coil 36, the circuit of the relay 24 and ground. In this manner, operating potential is applied to the relay 24 in the form of the negative potential and ground.

As operating potential is applied across the coil 26 of the relay 24, the relay is operated and the contacts including contacts 28 and 29, associated with the relay are reversed from the normal state. Subsequently operating potential is removed from the relay associated with the coil 33 and the contacts 33$a$ and 33$b$ are opened to remove the operating potential from the relay 24. Due to magnetic characteristics of the core material of the coil 26, the relay 24 will remain in the operated state after the operating potential has been removed when the operating potential is removed from the coil 33 and the associated contacts 33a and 33b are opened.

Subsequently, the clock-pulse generator 31 develops a pulse which is coupled to and sets a flip-flop 37 whereby a normally high output of the flip-flop goes to a low potential and the low potential is coupled to one side of the relay coil 36. It is noted that the relay coil 36 and the flip-flop 37 are included within the clock and control circuit 13. Since the other side of the relay coil 36 is connected to a positive potential, the relay associated with the coil 36 is operated whereby the contacts 36a is opened; and the associated contact 36b is closed. However, since the contact 33b remains open, the closing of the contact 36b merely facilitates the conditioning of a circuit for the application of a release potential to the circuit of the relay 24.

Shortly thereafter, the clock-pulse generator 31 controls the delay circuit 32 to provide a low level signal, for example, at ground, to one side of the relay coil 33 for a defined period of time. Since the opposite side of the coil 33 is connected to a positive potential, the relay associated with the coil 33 is operated and the contacts 33a and 33b are closed. Since the contact 36a is now open, the closure of contact 33a has no effect upon the operation of the circuit of the relay 24. Upon the closure of contact 33b, a release circuit is completed and includes a positive potential, the current-limiting resistor 34, the closed contact 33b, the closed contact 36b, the circuit of the relay 24 and ground whereby the release pulse of a defined amplitude is applied across the circuit of the relay 24 for a defined period of time determined by the clock-pulse generator 31 and the delay circuit 32.

During the defined period of time when the release pulse is applied to the circuit of the relay 24, the system 12 continuously monitors the circuit of the relay 24 to detect any variations in the pulse A which appears across the circuit of the relay. As previously noted, during a portion of the period when the release pulse is being applied to the circuit of the relay 24, the contacts 28 and 29 will be open simultaneously thereby altering the impedance of the circuit of the relay 24.

Referring now to FIGS. 2 and 3, the system 12 monitors the circuit of the relay 24 and observes the pulse A appearing across the circuit when the release pulse is applied to the circuit during the defined period. As shown in FIG. 3, the pulse A appears across the circuit of the relay 24 for a defined period when the release pulse is being applied to the circuit. The system 12 observes pulse A at point A' as shown in FIG. 2. The ideal pulse A has rapid rise and fall times and is slightly decaying between the leading and trailing edges of the pulse due to the magnetic characteristics associated with the recoil 26 of the relay 24.

During the period of time when the contacts 28 and 29 are both open, the impedance of the circuit of the relay 24 is increased thereby facilitating an increase in the voltage appearing across the circuit. This voltage change is observed by the system 12 as the pulse *a* which is superimposed on the pulse A and occurs sometime between the leading and trailing edges of the pulse A. The system 12 is designed to specifically detect and analyze the pulse *a* to determine whether the voltage amplitude and the pulse width are acceptable and consequently, to indicate the acceptability of impedances and release time characteristics of the relay 24.

When the pulse A is initially observed by the system 12, a capacitor 39 within the leading-slope detector 16 begins a charge cycle through a charging resistor 41 whereupon a positive potential is developed momentarily at the junction of the resistor and the capacitor which is connected through a current-limiting resistor 42 to a base 43 of a normally-nonconducting transistor, designated generally by the reference numeral 44, and is also included in the detector. Since an emitter 46 of the transistor 44 is connected to ground, the transistor is turned on to couple the ground to a collector 47 of the transistor. The collector 47 of the transistor 44 is connected through a resistor 48 to a positive potential and is further connected to a base 49 of a normally-conducting transistor 51 within the leading-slope detector 16.

When the transistor 51 is normally conducting, ground is coupled through an emitter 52 of the transistor 51 to a collector 53 of the transistor. The collector 53 of the transistor 51 is connected to a positive potential through a resistor 54 and is also connected to one input of an AND gate 56 of the leading-slope detector 16. The AND gate 56 is provided with another input and both inputs must be high in order to obtain a desirable low output. The second input of the gate 56 is connected to a delay circuit 57, which is included in the "window" pulse generator 14, and receives a pulse from the clock-pulse generator 31 at defined intervals. In response to the input pulse from the clock-pulse generator 31, the delay circuit 57 develops the gating "window" pulse B which is applied to one input of the gate 56 and is a high pulse occurring at a predetermined time and having a predetermined pulse width. It is noted that the gating pulse B is monitored by the system 12 at point B' at a junction between the delay circuit 57 and the AND gate 56. The delay circuit 57 can be any suitable delay type circuit well known in the art or it could be similar to the delay circuit 18 which will be decribed in detail hereinafter.

When the transistor 51 is turned off as the pulse A is initially observed by the system 12, the input from the transistor to the AND gate 56 goes high. However, the AND gate 56 requires two high inputs to develop a low output which is required to operate and control additional portions of the system 12. As shown in FIG. 3, the gating pulse B, which is a high pulse and which is applied to the other input of the AND gate 56, does not occur with the leading slope of the pulse A. Therefore, the AND gate 56 does not develop a low output when the pulse A is initially observed by the system 12. It is noted that the clock-pulse generator 31 provides a pulse for the delay circuit 57 simultaneously with the application of the release pulse to the circuit of the relay 24 and is delayed by the delay circuit for a substantial period of time represented by the distance between the leading slope of the pulse A and the leading slope of the gating pulse B as shown in FIG. 3.

When the pulse A has reached the peak of the pulse at the leading edge, the rapid rise of the edge ceases and the charging of the capacitor 39 ceases. As the capacitor 39 stops charging, current no longer flows through the resistor 41 and the base 43 of the transistor 44 is at ground potential. Since the base 43 and the emitter 46 of the transistor 44 are both at ground potential, the transistor is turned off thereby removing ground from the base 49 of the transistor 51. When ground is removed from the base 49 of the transistor 51, the positive potential connected to the resistor 48 is applied to the base 49. Since the base 49 is at a positive potential and the emitter 52 is at ground potential, the transistor 51 is turned on to couple ground, or a low potential, through the collector 53 to the associated input of the AND gate 56.

Referring now to FIG. 2, the trailing-slope detector 17 for detecting and analyzing the trailing slope of the pulse *a* includes a capacitor 58, a resistor 59 and a transistor, designated generally by the reference numeral 61, having a base 62, an emitter 63 and a collector 64. The detector 17 also includes a diode 66 and a resistor 67, which are connected commonly to the base 62 of the transistor 61, and a resistor 68 which is connected to the collector 64. Current normally flows in the circuit of the detector 17 which includes the positive potential, the resistor 59, the diode 66, the resistor 67 and ground which develops a positive potential on the base 62 of the transistor 61. Since the emitter 63 of the transistor 61 is at ground, the transistor is normally turned on to provide a low output on the collector 64 which is representative of the absence of the occurrence of the trailing slope of the pulse a. When the relay contact 36b is closed, as previously noted, ground is coupled through the coil 26 of the magnetic-latching relay 24 to one side of the capacitor 58 in the trailing-slope detector 17. Since the other side of the capacitor 58 is connected through the resistor 59 to a positive potential, the capacitor will charge to some value approaching the value of the positive potential. When the capacitor 58 charges, the biasing of the transistor 61 is altered and the transistor is turned off to develop a high on the collector 64. However, the AND gates 19 and 21 have not been conditioned to respond to the high output from the trailing-slope detector 17 at this time so the system 12 purposely ignores this condition. When the capacitor 58 is charged to a level approaching the level of the positive potential connected to the resistor 59, the biasing of the transistor 61 is restored and the trailing-slope detector 17 again provides a low output.

When the contact 33b is closed to facilitate the application of the release pulse to the circuit of the relay 24, the potential level monitored by the system 12 at point A' goes from a ground level to the peak value of the leading slope of pulse A which naturally is above ground and when applied to the one side of the capacitor 58 results in some discharging of the capacitor through the resistor 67 to ground. However, this does not affect the operation of the circuit which includes the transistor 61; and therefore, the transistor remains turned on.

As noted previously, after a defined period of time, the delay circuit 57 develops the gating pulse B which is a high pulse. The gating pulse B is applied to an associated input of the gate 56. Desirably and shortly thereafter, the contacts 28 and 29 of the relay 24 are open simultaneously which facilitates the development of the pulse a. As the leading slope of the pulse a occurs, the rapid rise time of the pulse facilitates additional charging of the capacitor 39 to develop momentarily a positive potential at the junction between the resistor 41 and the capacitor. The developed positive potential which occurs only during the rapid rise of the leading slope of the pulse a facilitates the turning on of the transistor 44 and the turning off of the transistor 51 in a manner previously described. As the transistor 51 is turned off, the associated input to the AND gate 56 goes high. Since the AND gate 56 now has simultaneous high inputs, the gate develops a low output.

The low output of the AND gate 56 is coupled to the set input of a flip-flop 69 and sets the flip-flop to provide a high output at a normally low output of the flip-flop which is applied to an inverter 71. The high output from the flip-flop 69 appears as the leading-slope indicator pulse C (FIG. 3) at point C'. The pulse is also coupled from the flip-flop 69 to one input of an AND gate 72, which is included in the AND gate 19, to indicate that the leading slope of the pulse a has occurred and that the rise time and voltage amplitude are sufficient to indicate that the impedance characteristics of the relay 24 are acceptable with respect to the leading portion of the pulse a.

The output of the inverter 71 is normally low and is coupled to the delay circuit 18 which includes a normally conducting transistor, which is designated generally by the reference numeral 73, having a base 74, an emitter 76 and a collector 77. In addition, the delay circuit 18 includes a positive potential, a resistor 78, a diode 79, a resistor 81, a resistor 82 and a capacitor 83. The diode 79 and the resistor 81 are connected commonly to the base 74 of the transistor 73 and are included in a bias-developing circuit connected between the positive potential and ground which includes the resistor 78 for normally developing a positive potential on the base 74 so that the transistor 73 is normally conducting. When the transistor 73 is normally conducting, a low signal appears on the collector 77 and is coupled to an inverter 84 which inverts the low signal to a high signal. The high output of the inverter 84, which is included in the delay circuit 18, is coupled to one input of the AND gate 72 and normally provides one enabling input for the gate. The output of the transistor 73, appearing on the collector 77, is also coupled to an AND gate 86 which is included in the AND gate 21 and requires two high inputs to operate. When the trailing slope of the pulse a occurs prior to the desired time, which indicates the unacceptability of the release time characteristics of the relay 24, the AND gate 86 is operated.

When the inverter 71 receives the leading-slope indicator pulse C, the output of the inverter goes low and facilitates the charging of the capacitor 83 thereby drawing charging current through resistor 78 from the positive potential source connected to the resistor. As the charging of capacitor 83 occurs, current ceases to flow through the resistor 81, and the base 74 of the transistor 73 goes to ground potential thereby turning off the transistor. When the transistor 73 is turned off, the output on the collector 77 goes high and appears as the high, intermediate pulse D (FIG. 3) at point D' (FIG. 2). It is noted that the intermediate pulse D begins simultaneously with the initiation of the pulse a.

Once the capacitor 83 has charged to a sufficient value, substantially equal to the value of the positive potential connected to the resistor 78, the charging of the capacitor ceases and the biasing of the transistor 73 is established by the application of a positive potential on the base 74 to turn on the transistor. When the transistor 73 is turned on, the collector 77 goes low thereby terminating the intermediate pulse D whereby a low signal again appears at the collector.

The intermediate pulse D is coupled to the AND gate 86 to condition the gate for operation. If a high pulse is applied to the other input of the AND gate 86 during the period of the intermediate pulse D, which would indicate a deficiency in the width of the pulse a, the gate develops a low output.

The intermediate pulse D is also coupled to the inverter 84 which develops the gating pulse E which is normally high but is low during the period when the intermediate pulse D occurs and appears at point E' (FIG. 2). It is noted that the intermediate pulse D terminates shortly before the desired termination of the pulse a and provides the necessary inhibiting of the operation of the AND gate 72 for a desired period of time during which it would be undesirable for the pulse a to terminate. The gating pulse E is coupled to one of the inputs of the gate 72 and cooperates with the trailing-slope detector 17 for indicating the desired occurrence of the trailing slope of the pulse a to indicate the acceptability of the pulse width of the pulse a and, consequently, the release time characteristics of the relay 24.

It is noted that during the rise time of the leading slope of the pulse a, the capacitor 58 will again discharge for a brief period through the resistor 67. However, this will not affect the normal conduction of the transistor 61. Therefore, the output of the transistor 61 remains low on the collector 64 and continues to inhibit the operation of the AND gates 72 and 86.

Subsequently, the contact 29 of the relay 24 closes and the pulse a terminates. During the rapid-fall time of the trailing slope of the pulse a, the capacitor 39 discharges slightly but does not result in the type of biasing which would turn on the transistor 44. However, the capacitor 58 charges for a very brief period, drawing current through the resistor 59 from the positive potential. This current drain is sufficient to decrease the positive potential appearing on the base 62 of the transistor 61 thereby turning off the transistor.

As the transistor 61 is turned off, the collector 64 goes high and results in the development of the enabling pulse F (FIG. 3) at point F' (FIG. 2). When the capacitor 58 is charged to a certain value, the biasing of the transistor 61 is such that the transistor is turned on whereby the collector 64 goes low and the high, enabling pulse F is terminated. However, during the occurrence of the enabling pulse F, the pulse is applied to one input of the AND gate 72 and, preferably, coincides with the application of portions of the high pulses B, C and E to enable the gate to develop a low output which is applied to the "set" input of a flip-flop 87 as a "GO" pulse so that a normally low output of the flip-flop goes high and is coupled to an AND gate 88. The flip-flop 87 and the AND gate 88 are included in the circuit of the AND gate 19 (FIG. 1). It is noted that the enabling pulse F should occur during any portion of a period defined by the leading slope of the gating pulse E and the trailing slope of the gating pulse B.

The AND gate 88 also normally receives a high input pulse from a normally high output of a flip-flop 89. If the pulse width is unacceptable, the low pulse developed by the AND gate 86, which is a "NO-GO" pulse, sets the flip-flop 89 to develop a low signal at the normally high output of the flip-flop which inhibits the enabling of the AND gate 88 thereby precluding the operation of the GO indicator 22. In addition, when the flip-flop 89 is set, a normally low output goes high and is coupled to an inverter 91. The flip-flop 89 and the inverter 91 are included in the circuit of the AND gate 21.

When both inputs to the AND gate 88 are high, the gate develops a low which facilitates the operation of a GO lamp 92, which is included in the GO indicator 22, thereby indicating that the analyzing of the pulse $a$ indicates the acceptability of the relay 24 in terms of impedance and release time characteristics. If the flip-flop 89 is set, a high pulse is applied to the inverter 91 which develops a low output for facilitating the illumination of a NO-GO lamp 93, in the NO-GO indicator 23, to indicate that the pulse width of the pulse $a$ is unacceptable; and therefore, the release time characteristics of the relay 24 are unacceptable. If neither of the lamps 92 and 93 are illuminated, this provides an indication that any one or all of the conditions relating to the voltage amplitude and rise and fall times associated with the leading and trailing slopes, respectively, of the pulse $a$ are unacceptable; and consequently, the impedance characteristics of the relay 24 are unacceptable.

Subsequently, the pulse applied to the coil 33 terminates; and the contacts 33a and 33b are opened to terminate the application of the release pulse to the circuit of the relay 24. As the termination of the release pulse occurs, the pulse A terminates and the capacitors 39 and 58 will discharge. In addition, the clock-pulse generator 31 provides an output pulse for resetting the flip-flops 37 and 69 whereby the contact 36a is closed and the contact 36b is opened. In addition, the pulse applied to the flip-flops 37 and 69, which is in the form of a low pulse, is applied to a junction between the resistor 78 and the capacitor 83 which initiates a current drain from the positive potential connected to the resistor 78 thereby removing the operating bias for the transistor 73. Consequently, the transistor 73 is turned off and a high output pulse appears on the collector 77. The high output pulse is inverted by the inverter 84 and provides a low input pulse to the "reset" input of the flip-flop 87 thereby resetting the flip-flop. If the flip-flop 89 had previously been set, a manually operable switch 94 facilitates the application of a low to the "reset" input of the flip-flop so that the flip-flop is reset. The system 12 is now conditioned for another testing cycle.

After the trailing slope of the pulse $a$ has occurred, that is, as the contact 29 is closed, the contact bounces. The bouncing of the contact 29 results in the development of brief, sporadic pulses (not shown) which would be superimposed on the pulse A after the occurence of the pulse $a$. When the pulses due to bouncing of the contact 29 occur and are superimposed on a portion of the pulse A after the occurrence of the pulse $a$, sporadic pulses occur after the enabling pulse F, appearing at point F′ of the system 12, and enable the AND gate 72. If the sporadic pulses occur before the trailing slope of the gating pulse B, the AND gate 72 is enabled during each sporadic pulse to develop and output which is applied to the "set" input of the flip-flop 87. However, the flip-flop 87 has previously been set by the occurrence of the enabling pulse F and remains in the "set" state to facilitate the continued operation of the GO indicator 22. Therefore, the sporadic pulses which may occur due to bounce of the closing contact 29 do not affect the analyzing of the pulse $a$ by the system 12 in determining the acceptability of the pulse $a$ and the relay 24 being tested.

If the trailing slope of the pulse $a$ occurs undesirably during the period of the intermediate pulse D, the AND gate 86 is enabled, as previously described, and facilitates the setting of the flip-flop 89 whereby the normally low output of the flip-flop goes high and is inverted by the inverter 91 to facilitate the operation of the NO-GO indicator 23. In addition, when the flip-flop 89 is set, the normally high output of the flip-flop goes low and inhibits the enabling of the AND gate 88 to preclude the accidental operation of the GO indicator 22 during a NO-GO condition. If any sporadic pulses should thereafter occur due to the bounce of the contact 29, these sporadic pulses would appear at point F′ of the system 12 and result in the enabling of the AND gate 72 and, consequently, the setting of the flip-flop 87. However, the AND gate 88 could not be enabled to operate the GO indicator 22 due to the inhibiting low which is coupled from the flip-flop 89 to one input of the AND gate 88. Thereafter, any sporadic pulses which are developed due to the bounce of the closing contact 29 do not affect the operation of the system 12 and the NO-GO indicator 23 remains operated to indicate the undesirable occurrence of the enabling pulse F during the period of the intermediate pulse D.

Thus, the system 12 detects the pulse $a$ and analyzes the voltage amplitude and rise and fall times of the leading and trailing slopes, respectively, of pulse $a$ to determine the acceptability of the impedance characteristics of the relay 24 being tested. In addition, the system 12, through the use of the same circuits which analyze the leading and trailing slopes of the pulse $a$, also analyze the relative time occurrence of the leading and trailing slopes to determine the acceptability of the width of the pulse $a$; and consequently, the acceptability of the release time characteristics of the relay 24 being tested. Further, the system 12 detects and analyzes the pulse $a$ without concern for sporadic pulses developed by the bouncing of the closing contact 29.

It is to be understood that the above-described arrangements are simply illustrative of the invention. Other arrangements may be devised by those skilled in the art which will embody the principles of the invention and fall within the spirit and scope thereof.

What is claimed is:
1. A method of detecting and analyzing a pulse generated during a period when a relay being tested is released from an operated state to determine the acceptability of impedance and release time characteristics of the relay which are directly related to the voltage amplitude and width of the generated pulse, which comprises the steps of:

operating a relay being tested, releasing the relay at a predetermined time so that normally open and normally closed contacts within an internal circuit of the relay are open simultaneously during a portion of the time when the relay is being released whereby a pulse to be detected and analyzed and representing impedance and release time characteristics of the relay is developed when the contacts are open, detecting a leading slope of the pulse being detected and analyzed in response to the rise time and voltage amplitude of the leading slope of the pulse which indicates the acceptability of the rise time and voltage amplitude and the occurrence of the leading slope of the pulse, detecting a trailing slope of the pulse being detected and analyzed in response to the fall time and voltage amplitude of the trailing slope of the pulse which indicates the acceptability of the fall time and voltage amplitude and the occurrence of the trailing slope of the pulse, developing a first gating period at a predetermined time after the beginning of the period when the relay is being released during any portion of which the pulse being detected and analyzed should occur, developing a second gating period to occur a predetermined time after and in response to the detection of the occurrence of the leading slope of the pulse being detected and analyzed during the first gating period, and detecting whether the leading slope of the pulse being detected and analyzed occurs during the period of the first gating period and whether the trailing slope of the pulse occurs during the period of the second gating period as an indication of the acceptability of the impedance and release time characteristics of the relay.

2. The method as set forth in claim 1 including the step of preventing an erroneous indication of the relative time in which the pulse being detected and analyzed occurs when at least one sporadic pulse occurs after the occurrence of the trailing slope of the pulse being detected and analyzed.

3. A system for detecting a pulse and analyzing the voltage amplitude and width of the pulse, which comprises:

a first input circuit for receiving a pulse to be detected and analyzed and having means responsive to the rise time and voltage amplitude of a leading slope of the pulse being detected and analyzed for developing a first enabling pulse which indicates the acceptability of the rise time and voltage amplitude and the occurrence of the leading slope of the pulse being detected and analyzed, a second input circuit for receiving the pulse being detected and analyzed and having means responsive to the fall time and voltage amplitude of a trailing slope of the pulse for developing a second enabling pulse which indicates the acceptability of the fall time and voltage amplitude and the occurrence of the trailing slope of the pulse, means for developing a first gating pulse at a predetermined time and having a predetermined pulse width to define the beginning of a period during any portion of which the pulse being detected and analyzed should occur, means responsive to the development of the first enabling pulse during the period of the first gating pulse for developing a leading slope indicator pulse which indicates the occurrence of the leading slope of the pulse being detected and analyzed during a predetermined period and further indicates the acceptability of the voltage amplitude of the leading slope of the pulse, means responsive to the development of the leading slope indicator pulse for developing a second gating pulse to occur a predetermined time after the development of the leading indicator pulse, and means for detecting whether the first enabling pulse and the occurrence of the second enabling pulse during a portion of a period defined by a leading slope of the second gating pulse and a trailing slope of the first gating pulse occur simultaneously as an indication of the acceptability of the voltage amplitude and width of the pulse being detected and analyzed.

4. The system as set forth in claim 3, wherein the means for developing the second gating pulse comprises:

means for developing an intermediate pulse having a width defined by a period between the time of occurrence of the leading slope of the pulse to be detected and analyzed and a predetermined time thereafter which precedes the time of the desired occurrence of the trailing slope of the pulse to be detected and analyzed, and means responsive to the termination of the intermediate pulse for developing the second gating pulse which defines the beginning of a desired period during a portion of which the trailing slope of the pulse being detected and analyzed should occur.

5. The system as set forth in claim 3 including means for preventing an erroneous indication of the relative time in which the pulse being detected and analyzed occurs when at least one sporadic pulse occurs after the detection of the occurrence of the trailing slope of the pulse being detected and analyzed.

6. The system of claim 3 wherein the first input circuit comprises:

a first transistor circuit, a second transistor circuit coupled to the first transistor circuit, the second transistor circuit having an output connected to the means for developing the leading slope indicator pulse.

the normal operation of the first transistor circuit normally biasing the second transistor circuit so that the output of the second transistor circuit inhibits the operation of the means for devolping the leading indicator pulse, and means responsive to the rise time, voltage amplitude and occurrence of the leading slope of the pulse being detected and analyzed for controlling the biasing of the first transistor circuit so that the second transistor circuit is controlled to develop the first enabling pulse which is coupled to the means for developing the leading indicator pulse.

7. A system for detecting and analyzing a pulse, which comprises:

a first AND gate, a first transistor circuit responsive to a leading slope of a pulse to be detected for developing a leading slope indicator pulse, a circuit for developing a first gating pulse for a predetermined period, means for coupling the leading slope indicator pulse to one input of the first AND gate during a period when the first gating pulse is being applied to another input of the first AND gate so that a first enabling is developed by the first AND gate indicating the occurrence of the leading slope of the pulse being detected and an analyzed, a second transistor circuit responsive to a trailing slope of the pulse to be detected for developing a second enabling pulse, a third transistor circuit responsive to the first gating pulse for developing a second gating pulse a predetermined time after the development of the first gating pulse, a second AND gate, and means for coupling the first and second gating pulses and the first and second enabling pulses to inputs of the second AND gate so that when the second enabling pulse occurs after the developing of a leading portion of the second gating pulse, before the termination of the first gating pulse and during the period of the first enabling pulse whereby an indication is provided of the occurrence of the leading and trailing slopes of the pulse being detected and analyzed within desired periods.

8. The system as set forth in claim 7 including:

a third AND gate, and means for coupling the second enabling pulse and the second gating pulse to inputs of the third AND gate so that when the second enabling pulse occurs prior to the period of the second gating pulse an indication is provided of the occurrence of the trailing slope of the pulse being detected and analyzed prior to a period when the trailing slope should desirably occur.

9. The system as set forth in claim 8 including means for preventing an erroneous indication of the period during which the trailing slope of the pulse being detected and analyzed occurs when at least one sporadic pulse occurs after the occurrence of the trailing slope.

10. A system for detecting and analyzing a pulse generated during a period when a relay being tested is released from an operated state to determine the acceptability of impedance and release time characteristics of the relay which are directly related to the voltage amplitude and width of the generated pulse, which comprises:

a clock circuit for developing controlling pulses for operating a relay being tested and for applying a release pulse to the relay at a predetermined time so that normally open and normally closed contacts within an internal circuit of the relay are open simultaneously during a portion of the time when the release pulse is being applied to the relay whereby a pulse to be detected and analyzed and representing impedance and release time characteristics of the relay is developed when the contacts are open, a first input circuit for receiving the pulse to be detected and analyzed and having means responsive to the rise time and voltage amplitude of a leading slope of the pulse being detected and analyzed for developing a first enabling pulse which indicates the acceptability of the rise time and voltage amplitude and the occurrence of the leading slope of the pulse being detected and analyzed, a second input circuit for receiving the pulse being detected and analyzed and having means responsive to the fall time and voltage amplitude of a trailing slope of the pulse being detected and analyzed for developing a second enabling pulse which indicates the acceptability of the fall time and voltage amplitude and the occurrence of the trailing slope of the pulse, means for developing a first gating pulse at a predetermined time and having a predetermined pulse width to define a time and a period during any portion of which the pulse being detected and analyzed should occur, the clock circuit developing and applying a pulse to the means for developing the first gating pulse simultaneously with the application of the release pulse to the relay being tested, the means for developing the gating pulse including means for delaying the development of the first gating pulse for a predetermined time after the application of the release pulse to the relay being tested so that the first gating pulse defines the period during any portion of which the pulse being detected and analyzed should occur, means responsive to the development of the first enabling pulse during the period of the first gating pulse for developing a leading slope indicator pulse which indicates the occurrence of the leading slope of the pulse being detected and analyzed during the predetermined period defined by the first gating pulse and further indicates the acceptability of the voltage amplitude of the leading slope of the pulse, means responsive to the development of the leading slope indicator pulse for developing a second gating pulse to occur a predetermined time after the development of the leading slope indicator pulse, and means for detecting whether the first enabling pulse and the occurrence of the second enabling pulse during a portion of a period defined by a leading slope of the second gating pulse and a trailing slope of the first gating pulse occur simultaneously as an indication of the acceptability of the voltage amplitude and width of the pulse being detected and analyzed and the acceptability of the impedance and release time characteristics of the relay being tested.

11. The system as set forth in claim 10 including means for preventing an erroneous indication of the relative time in which the pulse being detected and analyzed occurs when at least one sporadic pulse occurs after the occurrence of the trailing slope of the pulse to prevent erroneous indication of the condition of the impedance and release time characteristics of the relay being tested.

12. A system for detecting the operating characteristics of a relay, which comprises:

means for providing timing pulses to provide output control pulses to various parts of the system, means for providing a release pulse for releasing a relay under test which begins at a specified time and has a specified width as determined by the timing pulses, the relay being released some time during the occurrence of the release pulse, means for providing a "window" gating pulse which begins a predetermined time after the beginning of the release pulse and having a defined width as determined by the timing pulses, means for detecting a pulse occurring across the relay circuit, including the relay coil, simultaneously with the release pulse, means for detecting the leading edge of a pulse to be detected and analyzed superimposed on the pulse occurring across the relay circuit, the superimposed pulse preferably occurring during the period of occurrence of the "window" gating pulse, means for detecting the acceptable occurrence of the leading slope of the superimposed pulse a specified time after the occurrence of the leading slope and for providing a gating pulse in response to the detection of the acceptable occurrence of the leading slope of the superimposed pulse, the gating pulse defining the beginning of a time period during any portions of which the trailing slope should occur, means for detecting the occurrence of a trailing slope of the superimposed pulse having a sufficiently rapid-fall time and voltage amplitude, and means for determining whether the trailing slope of the superimposed pulse occurs during a period of time subsequent to the occurrence of the leading edge of the delayed gating pulse and prior to occurrence of the trailing edge of the "window" gating pulse to indicate whether the relay possesses the desired electrical characteristics.

References Cited
UNITED STATES PATENTS 3,222,595  12/1965  Granberg  324—57
3,235,794  2/1966  Henderson  324—28

OTHER REFERENCES

Pulse & Digital Circuit (Millman & Taub), copyright 1956 by McGraw-Hill Book Co., p. 509.

RUDOLPH V. ROLINEC, Primary Examiner

E. L. STOLARUN, Assistant Examiner

U.S. Cl. X.R.

324—68